(12) United States Patent
Krishnamurthy et al.

(10) Patent No.: US 9,323,670 B2
(45) Date of Patent: Apr. 26, 2016

(54) PROTECTING VOLATILE DATA OF A STORAGE DEVICE IN RESPONSE TO A STATE RESET

(71) Applicant: Seagate Technology LLC, Cupertino, CA (US)

(72) Inventors: Vidya Krishnamurthy, Eden Prairie, MN (US); Shuangyi Tang, Eden Prairie, MN (US); Weihua Lin, Plymouth, MN (US); Steve Faulhaber, Bloomington, MN (US); Yong Yang, Edina, MN (US); Brian Edgar, Minneapolis, MN (US)

(73) Assignee: Seagate Technology LLC, Cupertino, CA (US)

( * ) Notice: Subject to any disclaimer, the term of this patent is extended or adjusted under 35 U.S.C. 154(b) by 225 days.

(21) Appl. No.: 14/200,785

(22) Filed: Mar. 7, 2014

(65) Prior Publication Data
US 2014/0189234 A1 Jul. 3, 2014

Related U.S. Application Data

(63) Continuation-in-part of application No. 13/292,169, filed on Nov. 9, 2011.

(60) Provisional application No. 61/422,544, filed on Dec. 13, 2010.

(51) Int. Cl.
*G06F 12/00* (2006.01)
*G06F 12/08* (2006.01)
(Continued)

(52) U.S. Cl.
CPC ........ *G06F 12/0804* (2013.01); *G06F 11/0727* (2013.01); *G06F 11/0751* (2013.01); *G06F 12/0868* (2013.01); *G06F 3/062* (2013.01); *G06F 3/0614* (2013.01);
(Continued)

(58) Field of Classification Search
CPC ... G06F 3/0614; G06F 3/062; G06F 11/0727; G06F 11/0751; G06F 12/0804; G06F 12/0868; G06F 12/0866
USPC ................. 711/113, 117, 154, 156, 162, 166; 707/674, 686; 714/6.3, 745, 764
See application file for complete search history.

(56) References Cited

U.S. PATENT DOCUMENTS 5,586,291 A 12/1996 Lasker et al.
5,852,705 A 12/1998 Hanko et al.
(Continued)

FOREIGN PATENT DOCUMENTS

EP 0 573 307 A2 12/1993

OTHER PUBLICATIONS

Final Office Action (Rejection) for U.S. Appl. No. 13/292,169, dated Jan. 15, 2014, 27 pages.
(Continued)

*Primary Examiner* — Reba I Elmore
(74) *Attorney, Agent, or Firm* — Westman, Champlin & Koehler, P.A.

(57) ABSTRACT

A plurality of aligned or unaligned data packets are received in a data storage device. A data bundle is constructed by concatenating different ones of the plurality of unaligned data packets. Data loss protection identifiers are utilized to track the construction of the data bundle. The data loss protection identifiers are employed to prevent at least one of packet data loss or metadata loss in response to detecting a state reset of the data storage device.

25 Claims, 13 Drawing Sheets

(51) Int. Cl.
*G06F 11/07* (2006.01)
*G06F 12/16* (2006.01)
*G06F 3/06* (2006.01)

(52) U.S. Cl.
CPC ............ *G06F 12/0866* (2013.01); *G06F 12/16* (2013.01); *Y02B 60/1225* (2013.01)

(56) References Cited

U.S. PATENT DOCUMENTS

| | | | |
|---|---|---|---|
| 6,295,577 B1 | 9/2001 | Anderson et al. | |
| 6,516,426 B1 | 2/2003 | Forehand et al. | |
| 6,826,630 B2 | 11/2004 | Olds et al. | |
| 6,996,668 B2 | 2/2006 | Gaertner et al. | |
| 7,007,208 B1* | 2/2006 | Hibbert | H04L 1/24 341/51 |
| 7,099,993 B2 | 8/2006 | Keeler | |
| 7,296,108 B2* | 11/2007 | Beukema | G06F 13/4013 710/307 |
| 7,318,121 B2 | 1/2008 | Gaertner et al. | |
| 7,350,046 B2 | 3/2008 | Sicola et al. | |
| 7,395,404 B2* | 7/2008 | Gorobets | G06F 12/0246 711/1 |
| 7,966,450 B2 | 6/2011 | Klein | |
| 8,015,433 B2 | 9/2011 | Chu et al. | |
| 8,171,219 B2 | 5/2012 | Trika et al. | |
| 8,296,504 B2 | 10/2012 | Chu et al. | |
| 8,332,582 B2 | 12/2012 | Nakamura et al. | |
| 8,402,210 B2 | 3/2013 | Mannen et al. | |
| 8,412,884 B1 | 4/2013 | Ide et al. | |
| 8,621,144 B2 | 12/2013 | Eschmann et al. | |
| 2002/0029354 A1 | 3/2002 | Forehand et al. | |
| 2004/0174631 A1 | 9/2004 | Tanaka et al. | |
| 2005/0055517 A1 | 3/2005 | Olds et al. | |
| 2005/0066121 A1 | 3/2005 | Keeler | |
| 2005/0240792 A1 | 10/2005 | Sicola et al. | |
| 2006/0075202 A1 | 4/2006 | Gaertner et al. | |
| 2006/0248387 A1 | 11/2006 | Nicholson et al. | |
| 2006/0271721 A1* | 11/2006 | Beukema | G06F 13/4013 710/307 |
| 2007/0150693 A1 | 6/2007 | Kaneko et al. | |
| 2008/0065845 A1 | 3/2008 | Montero et al. | |
| 2009/0161569 A1* | 6/2009 | Corlett | H04L 43/08 370/252 |
| 2009/0198888 A1 | 8/2009 | Mannen et al. | |
| 2009/0199217 A1 | 8/2009 | McBrearty et al. | |
| 2010/0211859 A1* | 8/2010 | Garcia | H04L 1/24 714/807 |
| 2010/0332717 A1 | 12/2010 | Maeda et al. | |
| 2012/0151134 A1 | 6/2012 | Friendshuh | |
| 2012/0221879 A1 | 8/2012 | Hutchison et al. | |
| 2012/0284561 A1 | 11/2012 | Wilson | |
| 2013/0260687 A1* | 10/2013 | Paycher | H04W 72/1215 455/41.2 |

OTHER PUBLICATIONS

Non-Final Office Action (Rejection) for U.S. Appl. No. 13/292,169, dated Apr. 23, 2013, 25 pages.
Write Caching, Charles M. Kozierok, Apr. 17, 2001, retrieved from http:www.pcguide.com/ref/hdd/op/cacheWrite-c.html on Jan. 11, 2014 (2 pages).
Momentus 5400 PSD, Seagate, copyright 2007, retrieved from http://www.seagate.com/docs/pdf/datasheet/disc/ds_momentus_5400_psd.pdf on Aug. 14, 2013 (2 pages).
22 File Caching, Spring 2000, retrieved from www.mpi-sws.org/~druschel/courses/os/lectures/fs-caching.ps.gz? Jan. 11, 2014 (2 pages).
Product Manual Momentus 5400 FDE, Seagate, Aug. 2007, retrieved from http://www.seagate.com/staticfiles/support/disc/manuals/notebook/momentus/5400.2/PATA/100377037c.pdf on Jan. 11, 2014 (56 pages).
Computer Architecture: A Quantitative Approach (Third Edition), Hennessy et al., May 31, 2002, ISBM-10 1558605957, ISBN-13 978-1558605961, p. 683 (1 pages).
Data Storage—Logical Block Addressing (LBA), Nico Gerard, Sep. 21, 2010, retrieved from http://gerardnico.com/wiki/data_storage/lba on Jan. 11, 2014 (2 pages).
What is disk cache, Webopedia, retrieved from http://www.webopedia.com/TERM/D/disk_cache.html on Jan. 11, 2014 (3 pages).
WOW: Wise Ordering for Writes—Combining Spatial and Temporal Locality in Non-Volatile Caches, Gill et al., FAST '05: 4th USENIX Conference on File and Storage Technologies Dec. 14-16, 2005 (14 pages).
Advisory Action for U.S. Appl. No. 13/292,169, dated Apr. 3, 2014, 4 pages.

* cited by examiner

PROTECTING VOLATILE DATA OF A STORAGE DEVICE IN RESPONSE TO A STATE RESET

CROSS-REFERENCE TO RELATED APPLICATION

The present application is a continuation-in-part of and claims priority of U.S. patent application Ser. No. 13/292,169, filed Nov. 9, 2011, which is based on and claims the benefit of U.S. provisional patent application Ser. No. 61/422,544, filed Dec. 13, 2010, the contents of which are hereby incorporated by reference in its their entirety.

BACKGROUND

Hard disk drives and other data storage devices may utilize buffers, caches, etc., that use volatile memory such as dynamic random-access memory (DRAM). This allows a host device to transfer the data to the storage device at a high speed and without having to wait for all of the data to be written to the generally slower primary storage media, e.g., magnetic disk. The storage device can write the cached data to the media in the background as time allows. The result is an increase in the apparent performance of the storage device. However, if power is interrupted while cached data is still in DRAM, data loss may result.

SUMMARY

The present disclosure relates to protecting volatile data of a storage device in response to a potential volatile data loss (or state reset). In some embodiments, the volatile data may include data packets from multiple write commands received in the data storage device.

In one method embodiment, a plurality of data packets are received in a data storage device. A data bundle is constructed by concatenating different ones of the plurality of data packets. Data loss protection identifiers are utilized to track the construction of the data bundle. The data loss protection identifiers are employed to prevent at least one of packet data loss or metadata loss in response to detecting a state reset of the data storage device.

In one data storage device embodiment, a controller is coupled to a volatile memory of the data storage device and a backup memory of the data storage device, the backup memory includes non-volatile memory. The controller is configured to construct a data bundle in the volatile memory by concatenating different ones of a plurality of data packets received in the data storage device. The controller is also configured to utilize data loss protection identifiers to track the construction of the data bundle, and configured to employ the data loss protection identifiers to prevent at least one of packet data loss or metadata loss in response to detecting a state reset of the data storage device.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same components in multiple figures.

DETAILED DESCRIPTION

This disclosure generally relates to use of volatile memory in a non-volatile (e.g., persistent) data storage device. Methods, systems, and apparatuses described herein utilize volatile memory to improve performance, and include features that protect data temporarily stored in the volatile memory from unexpected power losses, resets, and other events that may clear or corrupt data stored in the volatile memory. In one embodiment, this involves obtaining power from a spindle motor attached to a still-spinning disk, and storing volatile data in a non-volatile, solid-state memory. This may also involve detecting events at a host that, while not a data-loss-causing event in itself, may prevent the storage device from protecting data if a data-loss-causing event does occur. Generally, these features can be implemented such that a storage device positively knows 1) whether it failed to protect data, 2) whether there was no data to protect, or 3) whether neither 1) or 2) can be determined, in which case it may be assumed data was not protected.

Figure 1:
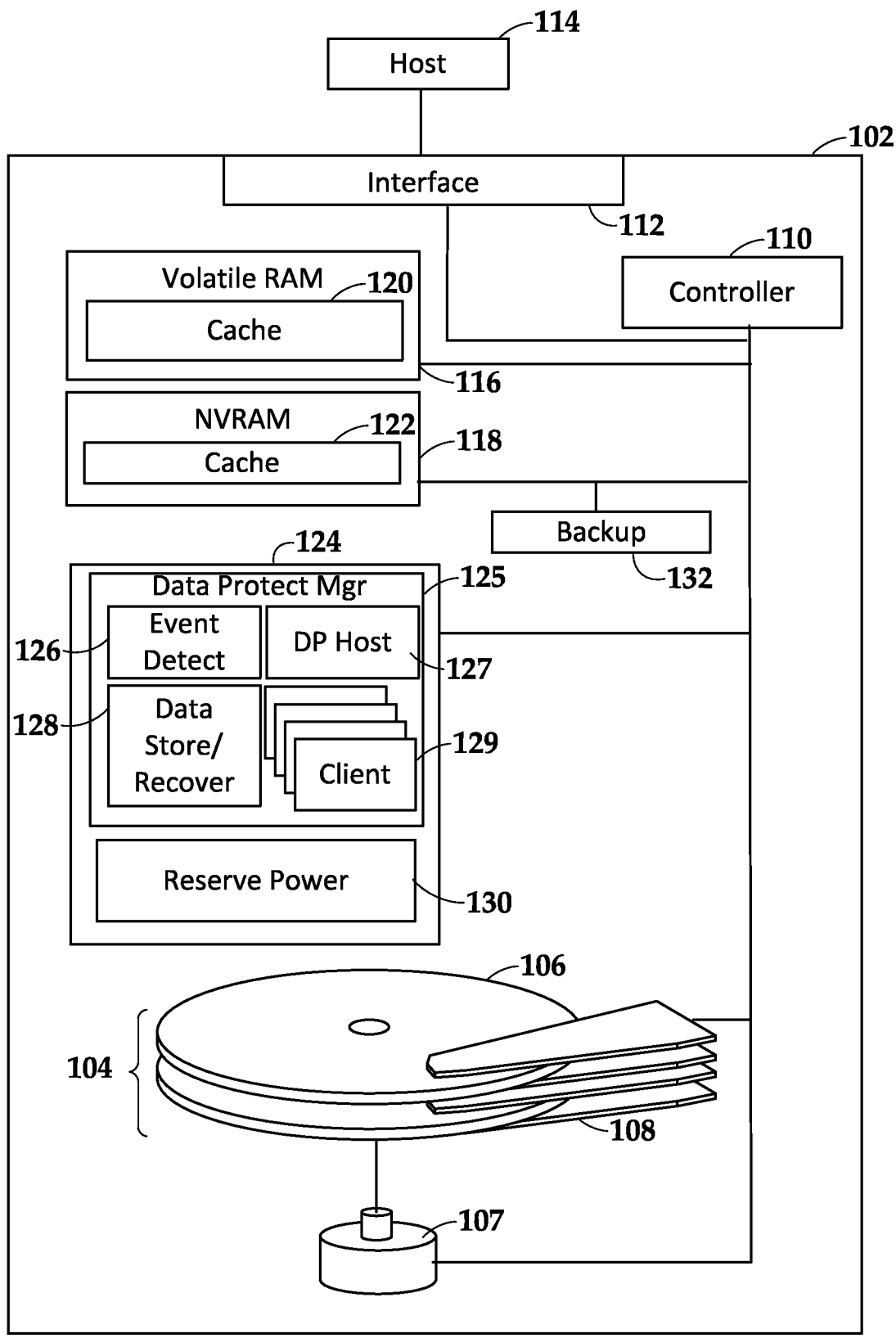
FIG. 1 is a block diagram of an apparatus according to an example embodiment.

In FIG. 1, a block diagram illustrates an apparatus 102 that includes features according to an example embodiment. The apparatus 102 includes main persistent data storage media 104 that, in this example, includes one or more magnetic disks 106. The disks 106 store data as magnetic patterns that are read by sensors (e.g., magnetic read/write sensors) mounted on a pivoting arm assembly 108. An actuator (not shown) is coupled to the arm assembly 108 and moves the sensors radially across the disk. A controller 110 includes one or more processors (e.g., application specific integrated circuits, or ASICs) operable via firmware or software to control various functions of the apparatus 102.

The disks 106 coupled to a spindle motor 107 that rotates the disks 106 while they are being read from and written to by the read/write sensors. The controller 110 sends and receives signals (e.g., via encoder and decoder circuits) to and from one or more read/write heads on the arms. The signals are converted to data that is stored on the disks 106 and/or sent to a host 114 via host interface 112. While the main persistent storage media 104 is shown as a magnetic disk 106, the concepts described herein may be applicable to other types of non-volatile media used as a main data store, such as flash memory, electronically-erasable programmable read-only memory, magnetic tape, etc. For example, a hybrid drive may use both disks 106 and a solid-state non-volatile memory to store user data.

The host interface 112 communicatively couples the apparatus 102 to the host 114. The host interface 112 at least allows the host 114 to store and retrieve information to/from the main persistent storage media 104, and may communicate other data, such as device status. The host interface 112 may utilize standard communication interfaces and protocols, such as SATA, SCSI, eSATA, SAS, Fibre Channel, USB, etc. The host interface 112 provides both a standard means of communication between the apparatus 102 and host 114, as well as abstracting operations of the controller 110 and main persistent storage media 104. For example, the host 114 may access data by way of logical block addresses (LBAs) that are mapped internally to a different physical addressing scheme, e.g., based on cylinders, heads, and sectors.

The apparatus 102 may include a volatile random-access memory (RAM) 116, such as Dynamic-RAM (DRAM), Static-RAM (SRAM), etc., and non-volatile, solid-state RAM (NVRAM) 118, such as flash memory, resistive memory (RRAM), phase-change memory (PCM), spin-torque memory (STRAM), magnetoresistive memory (MRAM), etc. These memory devices 116, 118 may have a number of different uses, such as acting as temporary and permanent stores for data (e.g., state data) needed by the controller 110 during operation. The memory devices 116, 118 may also be used for caching host data, as represented by respective caches 120, 122.

Data retrieved from the main persistent storage media 104 or stored to the main persistent storage media 104 can be held in one or more caches 120, 122 to improve throughput. The caches 120, 122 have faster access and retrieval times than the main persistent storage media 104, although generally with less storage capacity. While there is some processing and data transfer overhead in using the one or more caches 120, 122, the faster media used by the cache can significantly improve overall performance of the apparatus 102 under many conditions. This is because the main persistent storage media 104 may be orders of magnitude slower than processors and busses of the host 114. The use of cache for both read and write may improve performance.

For some types of main persistent storage media 104, a write cache may be particularly useful in improving apparent performance of the apparatus 102. Generally, write commands (which at least include data to be stored on the apparatus 102) may be cached because of latency and/or bandwidth issues with non-volatile storage associated with writing. Some types of media (e.g., flash memory, shingled magnetic media) may write data slower than it can read data. In other cases, particular files may be fragmented so that significant latency is incurred, e.g., due to multiple seeks of arm 108 in writing the data.

Processes running on the host 114 may block execution until write data commands are successfully written to the main persistent storage media 104. By using a volatile cache 120 to temporarily store write commands, the process can return from the write call (presumably with successful status) and proceed to do other operations. The storage device 102 will complete the write to the main persistent storage media 104, e.g., as a background task.

The use of a volatile write cache 120 is not without cost, however. There is a risk that write commands cached in volatile cache 120 could be lost in the event of a state reset (e.g., power failure) affecting the storage apparatus 102. As the term "volatile" implies, any data stored in volatile memory is lost quickly once power is removed from the memory, and may also be cleared in response to a reset even if there is no power loss. This could lead to data files that are corrupt, incomplete, or otherwise unusable, and this mis-compare of data sent from the host 114 versus data that can be recovered from the apparatus 102 may be unknown to the host 114. The possibility of a mis-compare is unacceptable in some domains, such as enterprise computing.

The apparatus 102 includes functional components 124 that can provide the speed and ease of access of volatile memory with the reliability and integrity of nonvolatile memory. Generally, these functional components 124 may be software or firmware modules operable by the controller 110, although they may contain separate, discrete circuitry. In the latter case, the discrete circuitry may still be controlled by the controller, e.g., through command and data busses, or act as a secondary controller. The functional components 124 include an event detect module 126 that detects events that could cause volatile memory 116 of the storage device 102 to lose data. As will be described further below, module 126 can also detect events that would prevent the components of element 124 from protecting data in the case of loss of volatile memory. Generally, these events may lead to a reset of the state of the storage device 102. A state reset may include any event where the controller 110 of the storage device 102 reverts or is directed to an initial state. An example of state resets include expected or unexpected power cycling, logical resets (e.g., assertion of a reset line), and internal or external critical errors.

A common cause of a state reset is a power loss, either unexpected or expected. In response to an expected shutdown, the storage device 102 can usually ensure all volatile data is saved, e.g., flushing volatile cache 120 and storing local state data. In response to an unexpected power loss, the data storage device 102 includes a reserve power module 130 with software and/or circuits that provide reserve power so that selected data in volatile memory 116 can be backed up to a non-volatile backup memory 132 by a data backup module 128. The backup memory 132 may include portions of both non-volatile, solid-state memory 118 and portions of main volatile storage 104, either of which may be selected for use based on current power conditions. Once normal operation has returned (e.g., power is restored, chip reset completes), the data backup module 128 retrieves the data from the data backup module 128 and restores the data to the volatile memory 116. The functional modules 124 may be implemented in software (e.g., operating via a processor), hardware, firmware (e.g., operating via a processor), or any combination thereof.

The reserve power module 130 may be configured to reduce power consumption of the data storage device to ensure there is enough energy to at least store the volatile data to backup memory 132 together with metadata (e.g., header data). For example, circuitry that is not essential to data backup may have power removed. An example of such non-essential circuitry for this purpose includes hard disk signal processing circuits (e.g., preamplifiers, decoders, encoders) and control circuits (e.g., voice coil motor). Other non-essential circuitry may include host interface, indicator lights, heaters, sensors, etc.

The reserve power module 130 maintains stable power to certain internal components (e.g., controller, power switching circuits) after external power has been removed. For example, the spinning disks 106 are a source of rotational energy that can be utilized to provide power via the spindle motor 107. The spindle motor 107 is configured via the reserve power module 130 to act as a generator in such an event. The spinning motor provides a back electromotive force (EMF) that can generate enough power to prevent data loss from volatile memory 116 while the spinning disks 106 have minimum value of rotational inertia. The reserve power module 130 may obtain reserve power from any other source contained within the apparatus instead of or in addition to the spindle motor 107, including super capacitors, capacitors, batteries, flywheel, springs, or any other energy storage device known in the art.

In one embodiment, the event detector module 126 and data backup module 128 are configured as part of a host/client architecture that is collectively referred to as a data protection manager 125. The data protection manager includes a data protection (DP) host 127. Any feature that has volatile data needing preservation across resets and power cycles may have a dedicated client module 129. Individual client modules 129 may be associated with different data sets that require different handling. The data sets may have the same or different sources, types, priorities, formats, content, etc., and each module may process/provide data from two or more different sources, types, priorities, formats, content, etc.

When external power is removed, an interrupt is generated that the DP host 127 receives (via event detector module 126) and uses to gather critical data from the clients 129. Because the disks 106 cannot be written to when the spindle motor 107 is being used as a generator, the data store/recover module 128 stores client data to a non-volatile, solid state portion of backup memory 132. Even where other reserve power is used, it may still be preferable to store client data in the non-volatile, solid state portion of backup memory 132, as solid state memory may be significantly faster and more power efficient than the disks 106. The backup memory 132 may include a dedicated memory device used just for backup, or may be a part of memory allocated from general purpose data storage, e.g., part of the main storage of a hybrid device, part of main data store 104, etc.

The event detect module 126 also monitors for any condition in which the data protection manager 125 would not be able to successfully alert clients 129 and save their data before the data is lost. For instance, if the reserve power module 103 relies on the spindle motor 107 for reserve power and the disks 106 are spun down to save power, there is no longer any energy in the disks 106 to generate power if external power is lost. Because of this, the data protection manager 125 interrupts any attempt to spin down the disks 106 and saves all of the client's critical data to the backup memory 132 (e.g., NV memory 118 or disks 106) together with first header data, which includes identifying information and protection information about the client's critical data (shown in 310 of FIG. 3), before it allows the spin down to complete. In an example embodiment, the data is written to disks 106 in such an event to prevent wear on the non-volatile memory 118 and to prevent the need to erase the non-volatile memory 118 before being able to handle a power loss. However, the data could be written to any non-volatile media identified as part of the backup memory 132.

If the event detect module 126 detects an orderly shutdown, the data protection manager may still write header data (e.g., second header data shown in 318 of FIG. 3) to the backup memory 132 even after verifying that all volatile data was saved. This second header data allows the data storage device 102 to positively determine that no volatile data was lost after initializing state on the next power up. Generally, the second header data stored in this event may include metadata generated by each client module 129 that confirms no data loss. If the data storage device 102 initializes its state and finds no first or second header data in the backup region, the data storage device 102 may assume data was corrupted. In such an event, the data storage device 102 can alert the host 114, so that higher-level remedial action can be taken, e.g., lock down the storage device 102 and other related devices (e.g., other devices in a disk array), perform filesystem integrity checks, perform restore from an external backup, etc.

Figure 2:
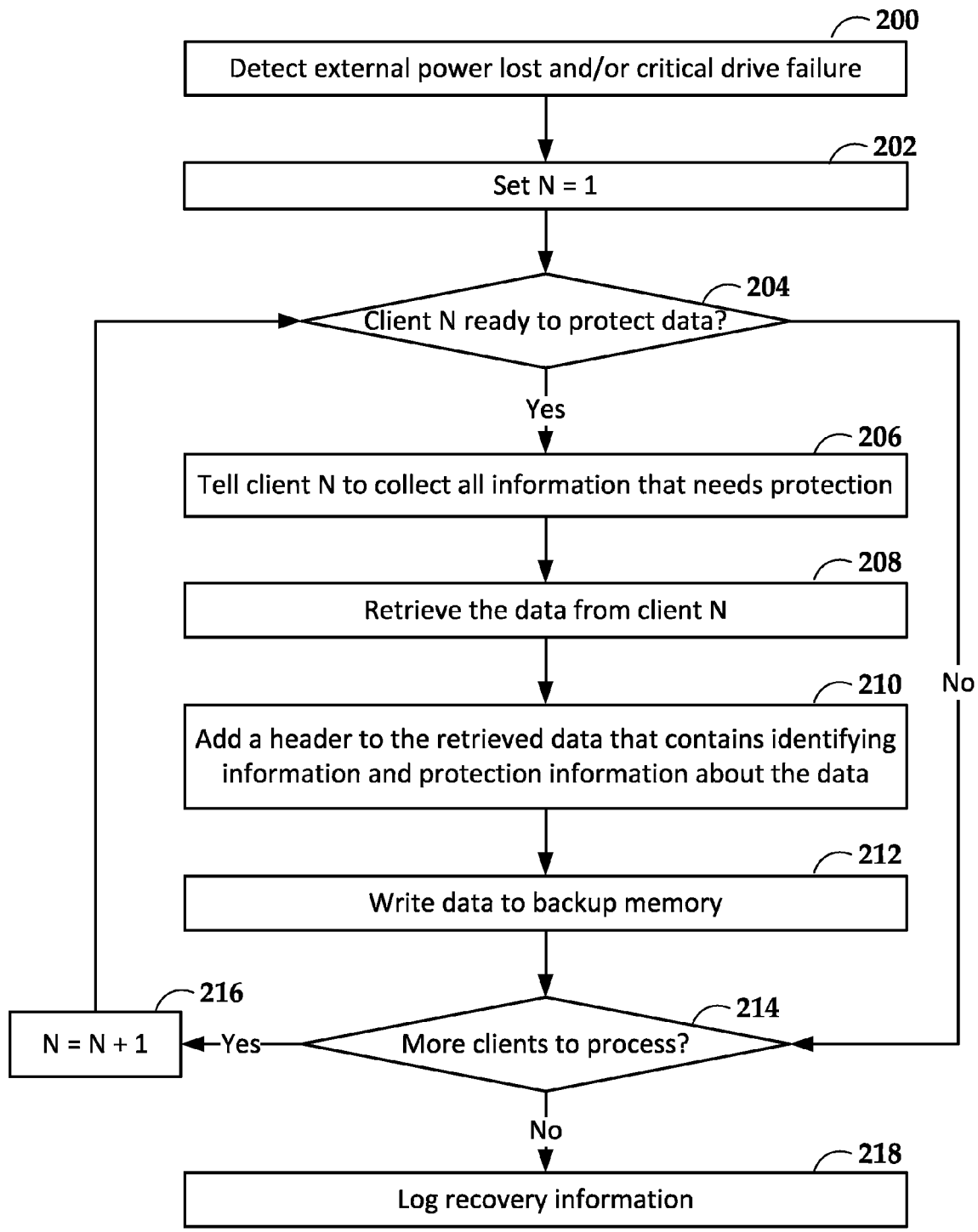
FIG. 2 is a flowchart illustrating protection of volatile data according to an example embodiment.

In reference now to FIG. 2, a flowchart illustrates a procedure for data protection according to an example embodiment. In this example, a data protection manager stores protected data to a non-volatile memory (e.g., flash memory) that is separate from the drives/disks being protected. The procedure begins in response to detecting 200 external power being lost and/or critical drive failure. A counter is initialized at block 202. The counter represents a reference that allows iterating through a list of clients, and any means of iterating through a collection may be used. A next client is selected at decision block 204, where it is determined whether or not the client is ready to protect volatile data.

If the client is not ready to protect the volatile data, then the procedure continues to the next client via blocks 214 and 216. If the client is ready to protect the data, the data protection manager tells 206 the client to collect data that needs protection, and the data is retrieved 208. At block 210, header data is added to the retrieved data. The header data may contain identifying information and/or protection information about the data. It should be noted that the header data may be added by one or both of the client and the data protection manager. The header data may include, among other things physical addresses, sector identifiers, logical addresses, cache addresses, data length, error correction data, time stamps, client identifiers, device identifiers, etc.

The retrieved and annotated data is then written 212 to backup memory. This operation 212 may include selecting, based on the condition detected at block 200, between a non-volatile, solid-state memory or disk portions of backup memory to write the retrieved and annotated data. The next client is processed similarly via blocks 214, 216, 204 until all clients have been processed. After all clients have been processed, recovery data is logged 218, e.g., to the same non-volatile memory where the retrieved data was written 212. The logged data enables determining that recovery is needed when power is recovered or other condition is cleared. The logged data may also facilitate the recovery, e.g., indicated where data stored at block 212 is stored.

A controller implementing a procedure such as shown in FIG. 2 may be configured to complete, in a specified time period, actions used at least to store the volatile data to a backup region together with header data. For example, each client may be given a maximum amount of time to retrieve 208 data. If the client hangs up or acts unexpectedly, this timer will still allow other client data to be saved. The maximum amount of time may be client-specific, e.g., based on an estimated amount of data the client indicates needs backing up, and/or a fixed amount, e.g., a ceiling. Even though interrupting a client operation may result in lost or corrupt data for that client (upon which the procedure would log a failed operation at block 218), allowing other clients to complete will at least minimize the amount of lost or corrupt data.

The controller implementing a procedure such as shown in FIG. 2 may also take other measures to minimize the amount of lost or corrupt data, given that there may be a limited amount of energy available to at least to store the volatile data to the backup memory together with header data. For example, clients could be sorted by data priority, such that clients with a particular priority-level and/or type of data (e.g., user data versus log data) may be processed first. In this way, even if all clients cannot be processed, a critical portion of the volatile data (e.g., that which can ensure no mis-compare happens after state reset) can be stored to non-volatile memory before reserve power runs out.

Figure 3:
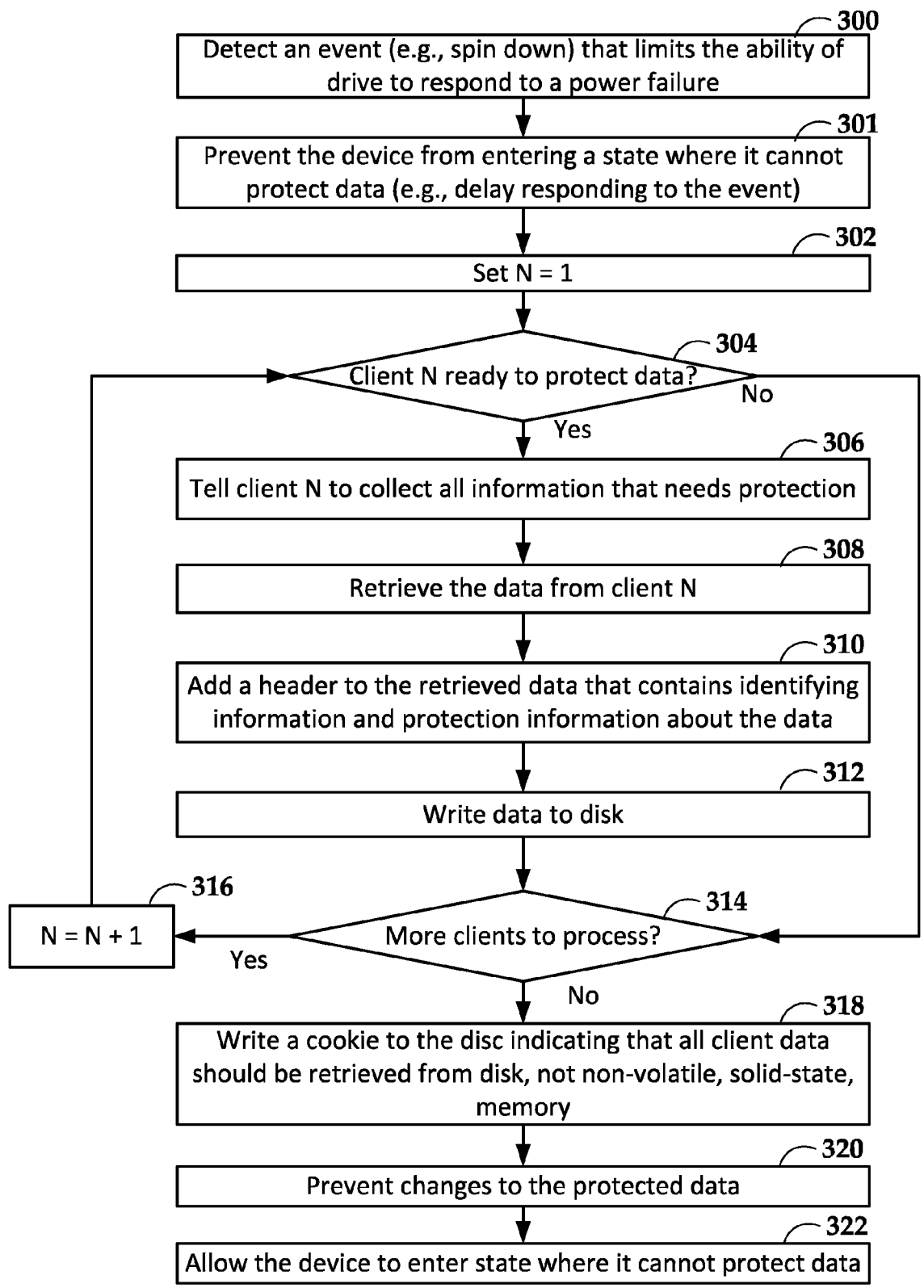
FIG. 3 is a flowchart illustrating protection of volatile data according to another example embodiment.

In reference now to FIG. 3, a flowchart illustrates a procedure for data protection according to an example embodiment. In this example, a persistent storage device is experiencing an event (e.g., spin-down or slow-down of disk) that limits the ability of the device to respond to a power failure of the host as shown in FIG. 2. The procedure begins in response to detecting 300 the event. In response to the event, the device is prevented 301 from entering the state detected in block 300 to allow the rest of the procedure in FIG. 3 to proceed to completion. A counter used for iterating through a list of clients is initialized at block 302. The counter represents a reference that allows iterating through a list of clients, and any means of iterating through a collection may be used. Client N is selected at decision block 304, where it is determined whether or not the client is ready to protect client-specific, volatile data.

If the client is not ready to protect the volatile data, then the procedure continues to the next client via blocks 314 and 316. If the client is ready to protect the data, the host tells the client at block 306 to collect data that needs protection, and the data is retrieved 308. At block 310, header data is added to the retrieved data. The header data may contain identifying information and/or protection information about the data, such as described in reference to block 210 in FIG. 2. Unlike FIG. 2, the retrieved and header-annotated data is written 312 to the disk (which in this example is at least part of the main storage media) instead of to a region of non-volatile memory reserved for backup. It should be noted that, in this and other embodiments, if other main storage is available, e.g., non-volatile solid-state memory of a hybrid drive, the other main storage could be used instead of the disk.

The next client is processed similarly via blocks 314, 316, 304 until all clients have been processed. After all clients have been processed, a cookie is written 318 to the storage device's main storage (e.g., disk). The cookie is small amount of persistent data that indicates that, in the event of a recovery, all client data should be retrieved from disk, not the backup region of non-volatile memory. The data protection manager thereafter prevents changes to the protected data as shown in block 320. For example, a range of physical or logical addresses may be flagged as read-only or the system may be restricted from accessing its main storage and/or volatile cache. Thereafter, the device can be allowed 322 to enter the state (e.g., spin down) where it cannot protect the data.

Once the condition detected in block 300 is no longer in effect, the data protection manager can reset its state, prepare to protect the client's information again in case another spin-down or similar event occurs, and allow changes to the data that was protected. For example, if the drive is spun back up and in full power mode; the data protection manager can clear the client's data that was stored on disk and allows normal operation to continue where the clients are protecting volatile data. An example of this is in FIG. 4, which is a flowchart showing how the data protection manager re-enables protection of volatile data according to an example embodiment.

Figure 4:
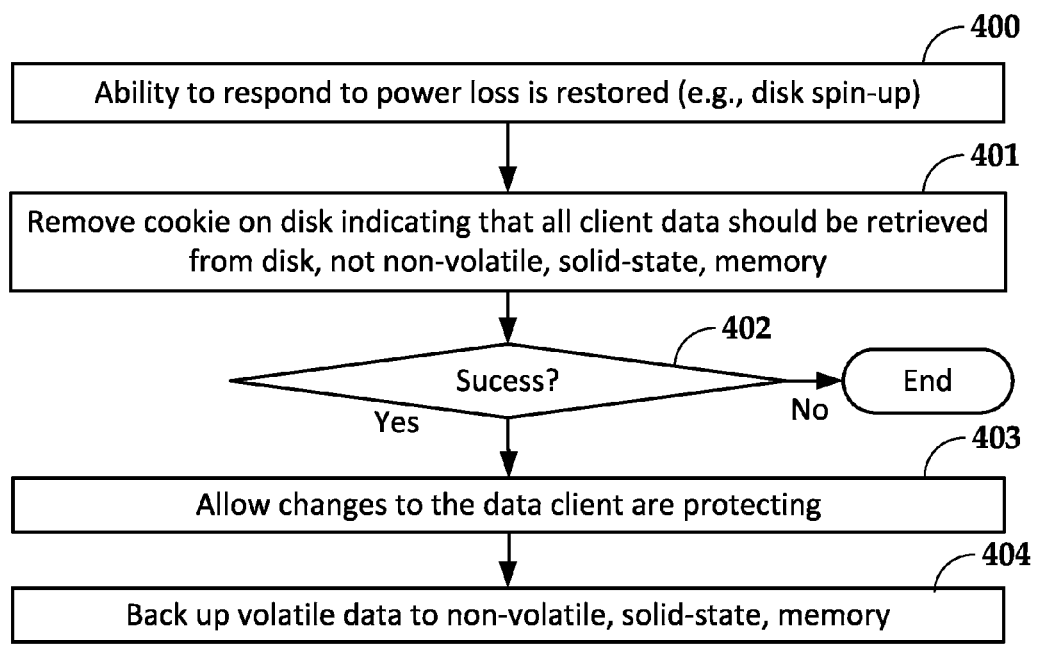
FIG. 4 is a flowchart illustrating re-enabling protection of data after disabling protection of data according to an example embodiment.

In FIG. 4, the data protection manager determines 400 the disk has spun up, or some other event that restores ability to respond to power loss. A cookie that was stored on the disk (e.g., at block 318 in FIG. 3) is removed 401. The existence of the cookie indicates that client data should be retrieved from the disk, and so removal 401 of the cookie indicates that thereafter client recovery data should be recovered from the region of non-volatile, solid-state memory. If it is determined at block 402 that removal of the cookie succeeds, at block 403 the data protection manager allows changes to data that was formerly being protected (e.g., at block 320 in FIG. 3), and the storage device will back up 404 volatile data to non-volatile memory (e.g., as shown in FIG. 2).

Figure 5A:
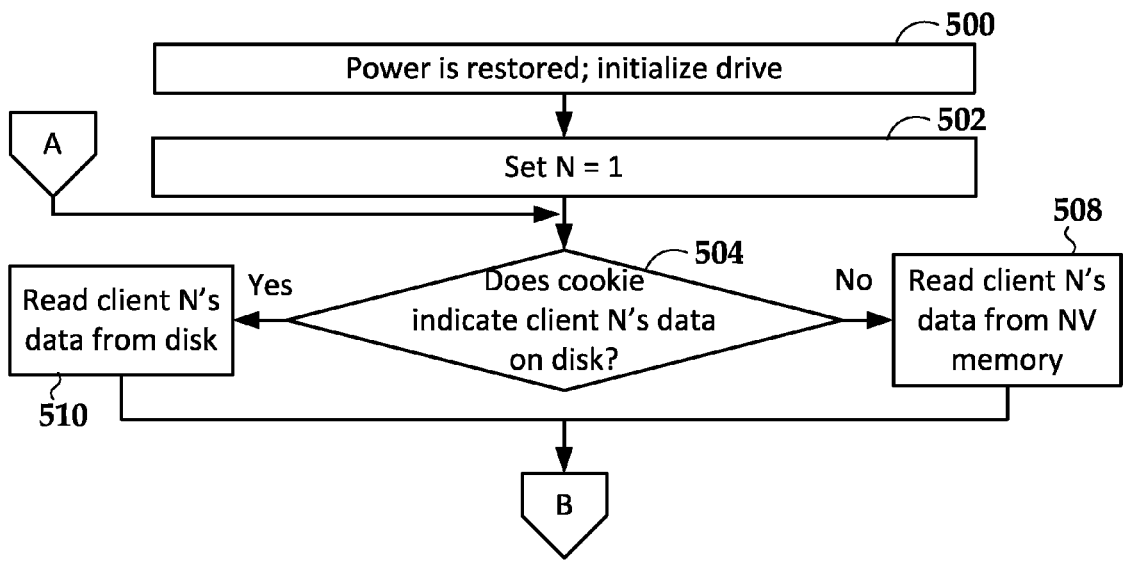
FIGS. 5A and 5B are flowcharts illustrating recovery of preserved volatile data according to an example embodiment.
Figure 5B:
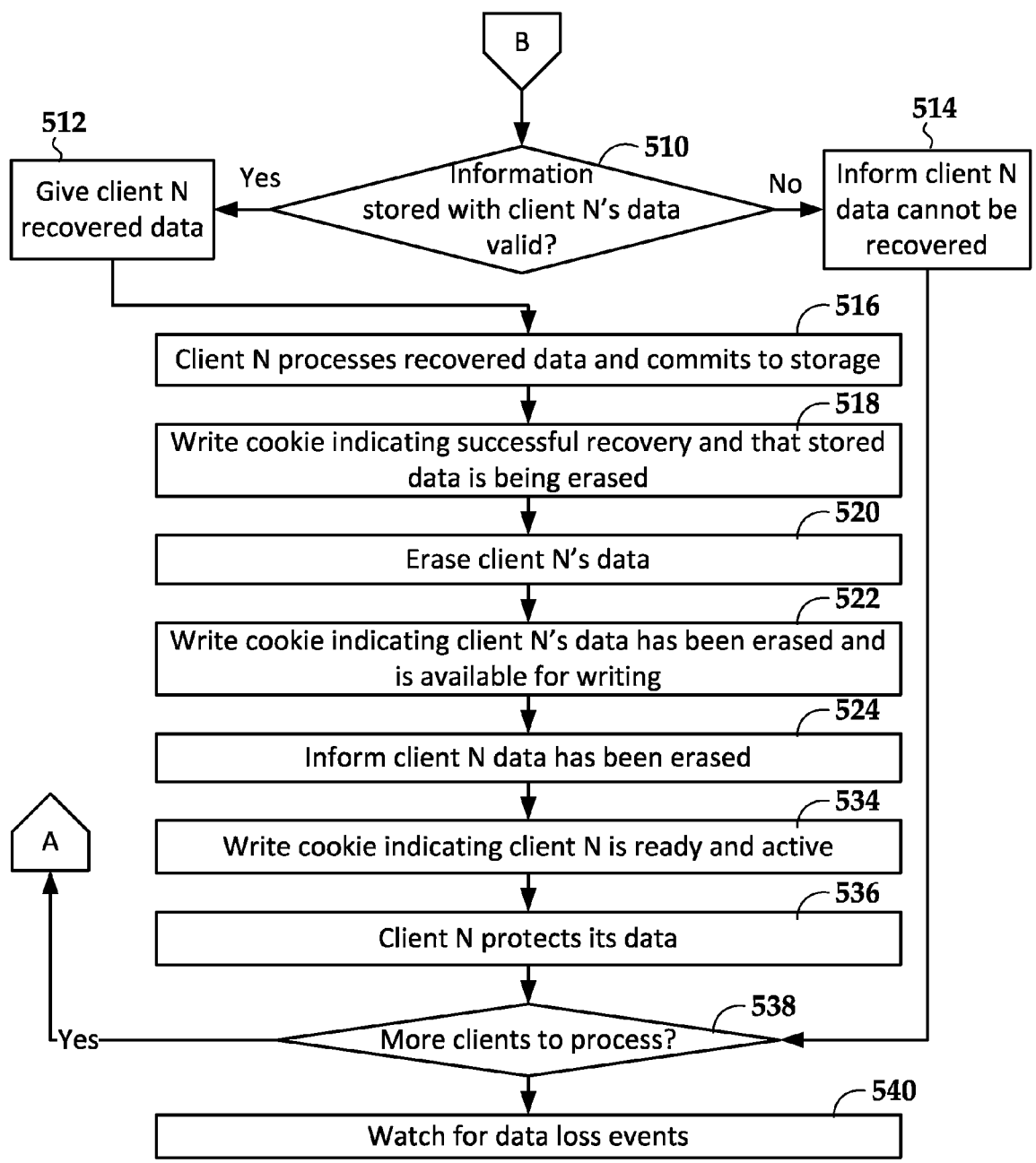

In reference now to FIGS. 5A and 5B, a flowchart illustrates a procedure for recovery after power on or reset according to an example embodiment. The procedure begins when restoration of power is detected 500, e.g., as part of drive initialization. As before, a counter used for iterating through a list of clients is initialized at block 502. For each client a check 504 is made to determine whether the client has a cookie stored on the disk. If so, the client's data is read from the disk as shown at block 506, otherwise the client's data (if any) is read from non-volatile, solid-state memory as shown at block 508. The flowchart continues in FIG. 5B.

Assuming recovery data has been found either via a cookie stored on disk or via data found in non-volatile, solid-state memory, a determination 510 is made as to whether the client's data is valid. If the data is not valid (or does not exist) then the client is informed that data cannot be recovered (or that there is no need to recover anything) as shown at block 514 and no further processing is done for the client. If data is found, it is given to the client as shown in block 512. At block 516 the client processes the recovered data and commits it to main storage and/or uses it to recover device state information, depending on the contents of the data the client stored. Processing may involve removing headers, performing additional checks, and writing to disk. Afterwards, at block 518, a cookie is written indicating that recovery was successful and stored data is being erased, which occurs at block 520.

At block 522, another cookie is written that indicates that the client's data has been erased. This client is informed of this erasure at block 524, and a cookie is written at block 526 indicating the client is ready and active. Thereafter, the client will protect its own data as indicated at block 536. If more clients are ready to process as determined at block 538, the sub-procedure beginning at block 504 of FIG. 5A repeats for the next client. If no more clients are to be processed, the device watches for more data loss events as shown in block 540.

It should be noted that the storage device may alert the host of potential data corruption if at least some data can't be recovered (e.g., block 514, or a failure between blocks 512 and block 518), because there is no way of knowing if there's a mis-compare (e.g., lost or corrupted volatile data). The host may lock the storage device (or the storage device may do this on its own) in response to such an alert to prevent further corruption of data and allow for remedial action to be taken. This may involve setting the storage device to a read-only state, such that changes to a main data storage of the device are prevented. A similar alert may occur if the storage device initializes due to a state reset, and can't find any header data. The clients may be customized to determine their own error handling based on the criticality of the data stored with each client, so that such a host alert may be made optional based on determination by clients.

Figure 6:
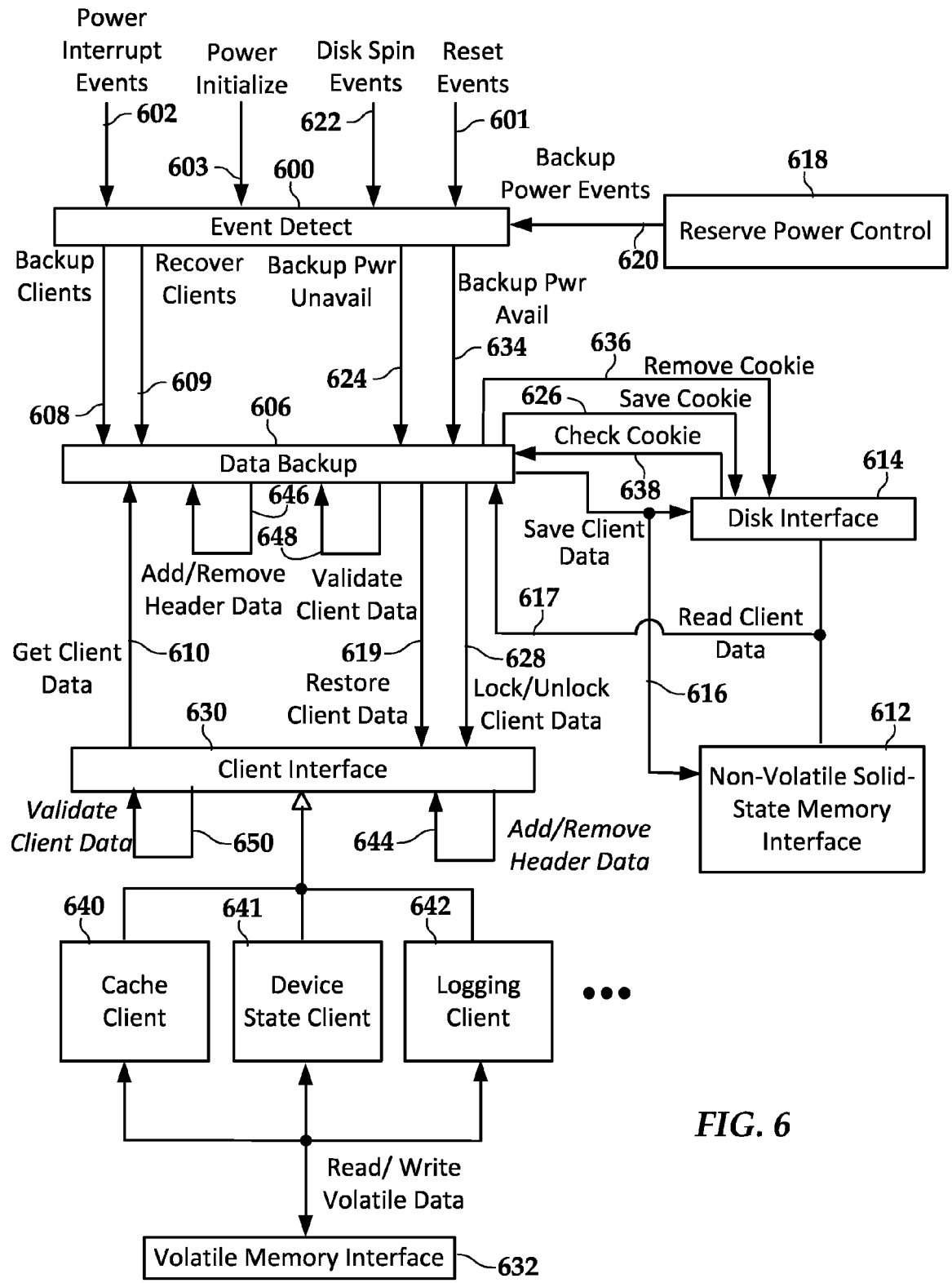
FIG. 6 is a block diagram that illustrates interactions between components and modules in a data storage device according to an example embodiment.

In reference now to FIG. 6, a block diagram illustrates interactions between components and modules in a data storage device according to an example embodiment. An event detect module 600 inserts itself into all routines, events, interrupts, etc., that may signal an imminent state reset. An example of reset events is represented by reset events 601, power interrupt events 602, and power initialize events 603. The reset events 601 may include an unexpected reset and/or a drive fault. In response to the events 601 or 602, the event detect module 600 sends a backup clients command 608 to a data backup module 606. In response, the data backup module gets client data from clients via command 610, and saves the client data to non-volatile, solid state memory interface 612 or disk interface 614 via command 616.

The event detect module 600 also monitors for reset events 601 and power initialize events 603. While these events 601, 603 may be in response to an unintended system interruption or part of normal/expected operations (e.g., clean reboot or reset), the event detect module 600 may not have knowledge whether a prior state reset was expected or unexpected. In order to positively determine whether or not main storage has been compromised due to the state reset, the event detect module 600 will always send a command 609 to recover clients in response to events 601-603. The data backup module 606 can read client data via command 617 and restore to the clients via command 619. The client data may target read command 617 to one or both of non-volatile, solid state memory interface 612 or disk interface 614.

Whether non-volatile memory interface 612 or disk interface 614 is chosen for storage of client data via command 616 depends on the availability of main or reserve power, as indicated by reserve power control module 618. Generally, a disk or other high-power consumption media may be unavailable if reserved power is used. For example, if a spindle motor coupled to rotating disk provides power via the reserve power control module 618, then the disk interface 614 will be unavailable not only for power consumption reasons, but because the disk is needed to generate power. Other reserve power sources may also be used via the reserve power control module 618, e.g., batteries, capacitors, etc.

If the reserve power control module 618 is able to provide power in response to the power interrupt event 602, the reserve power control module 618 may control switching in the reserve power source. Where a spindle motor is used, this may involve coupling back EMF from the spindle motor to power supply circuits of the device. The reserve power control module 618 will also decouple the power supply circuits from other circuits, such as non-essential components and host power supply lines. The reserve power control module 618 may communicate certain backup power events 620 to the event detect module, e.g., backup health/faults, amount of reserve power remaining, etc.

In the case where the spindle motor is a main source of reserve power, a change in the availability of the spindle motor to provide enough power is determined in response to disk spin events 622 detected by the event detect module 600. While the disk spin events 622 may generally relate to conditions that slow or stop spinning of the disks, e.g., to conserve power, these events 622 may also include any other device states, conditions, or modes that prevent enough power being available from back EMF to store data via the non-volatile memory interface 612. For example, a condition (either intentional or fault condition) that would cause excessive power draw from the local power bus might trigger disk event 622, even if the disk is currently spinning.

If the disk event 622 indicates an imminent condition where spindle power will be unavailable, the event detect module 600 sends a command 624 to the data backup module 606 indicating backup power will be unavailable. In response, the data backup module 606 will cause saving of client data 616 to the disk interface 614. The data backup module 606 will save a cookie to the disk via command 626 to indicate that the client data is found via the disk interface and not via the non-volatile memory interface 612.

After saving client data 616 and saving the cookie data 626, the data backup module 606 will also issue a command 628 to clients via client interface 630 to prevent further modification of the volatile data until the condition is cleared. This protection of the volatile data may be performed alternatively, e.g., directly by the data backup module 606. However, as will be described in greater detail below, the abstraction of the clients via the client interface 630 allows different operations to be performed for different types of clients, which in turn may utilize different types of client data. This allows extending and changing client data operations and structures without having to change the backup module 606 or other system components. This also allows abstracting interactions by the clients with a volatile memory interface 632.

Because events 622 can indicate an imminent condition where spindle power will be unavailable, the event detect module 600 may block other processes or modules from proceeding to complete the condition so that operations such as 616, 626, and 628 can be completed. For example, the disk spin event 622 may be in response to a host command that originates from a host interface. In such a case, the event detect module 600 can delay completion of the host command until the operations described above can be completed. This may be achieved by blocking return or acknowledgement of the command with the host until operations such as 616, 626, and 628 can be completed. If the disk spin event 622 is in response to an internal command (e.g., via system controller) the event detect module can block completion of the command until the operations described above can be completed.

The events 622 may also indicate that the condition causing spindle power to be unavailable has cleared. In such a case, the event detect module 600 issues command 634 to data backup module 606. In response, the backup module 606 removes the cookie via command 636 and unlocks the protected data via command 628. As described above, the event detect module 600 issues a client recover command 609 to the data backup module 606 in response to a power initialize event 603. The data backup module will first check for a cookie via command 638. If the cookie is detected, the volatile data is recovered from the disk interface 614. If the cookie is not detected, the volatile data is recovered from the non-volatile, solid-state memory interface 612.

As noted above, the client interface 630 provides an abstraction of client operations. Generally, a client is a functional entity of the storage device that utilizes volatile memory interface 632 to store operational data, such as user data, state data, logs, instructions, etc. Various client instances inherit the client interface 630 to maintain consistent interactions with the data backup module 606 and other system modules, but may vary widely in how the instances interact with the volatile memory interface 632, as well as in the formatting and structure of client-specific data that will be backed up.

In this example, three example client modules using the client interface 630 are shown: a cache client 640, a device state client 641, and a logging client 642. The cache client 640 manages user data, host commands, and the like, that may be cached in volatile memory to improve system performance, e.g., increase throughput, lower latency, etc. The device state client 641 manages data such as address translation tables, bad sector maps, status registers, etc. The logging client 642 manages data related to historical logs of normal and abnormal operations, cumulative performance values, etc.

Generally, each of the client modules 640-642 may have different client-specific data requirements and formats. For example, the cache client 640 may include user data that has not yet been committed to the disk or other non-volatile memory, whereas the other clients 641, 642 would not deal with the user data. Some of the client modules 640-642 may operate in particular, reserved portions of volatile memory, and may require different access privileges, access mechanisms, data formats, etc. While this disclosure is generally related to managing the contents of volatile memory at the time of events 601, 602 or 622, any of the client modules 640-642 may also have internal, periodic mechanisms for transferring data back and forth between volatile memory interface 632 and non-volatile memory interfaces 612 or 614.

The client modules 640-642 may also handle backup and recovery of their data differently. As indicated by internal virtual command 644 (which is instantiated differently by the instances), the client modules 640-642 may add client-specific data/metadata to headers to client data sent via command 610. The client modules may use this command 644 or a similar command to identify, remove, and interpret the header data received via restore command 619. The data backup module 606 may also add and remove higher-level header data/metadata, as indicated by internal command 646. This may be done integrally with or separately from validation of client data, which is indicated by internal command 648. The client interface 630 may also implement an analogous, virtual validation command 650 that can be implemented differently by different client instantiations.

Any of the client modules 640-642 may log header data in the non-volatile solid state memory or disk that facilitates recovering the volatile data saved there. For example, the headers added to the client data help the data protection manager to handle a power loss at any time without losing client data. The header information is added to the client data when it is stored to a non-volatile location via interfaces 612, 614. When the client data is read back, the header data can be used to determine how much data was saved, whether the data was saved and read back correctly (e.g., via protection information, checksums, error-correction codes, etc.), and determine state of the clients 640-642 at the time of power loss/reset. The header information is presented to each client 640-642 to allow the client to handle any errors in data recovery as it sees fit.

The data backup module 606 and other modules may also maintain a nonvolatile record of their state (including multiple copies of this state). In this way, even if power is lost in the middle of writing the nonvolatile copy of the device's state information, when the device is initialized it has a recoverable state of the device as it was at the time of the power loss. This state data may be stored as client data (e.g., separate from the headers) by the device state client 641 and/or logging client 642. Some of this state data may also be included in the headers added to data of the cache client 640. Alternatively, this state data may be saved directly by the data backup module 606 independently of the clients.

It will be understood that the modules and interfaces shown in FIG. 6 may be implemented using any combination of dedicated logic circuitry or instructions running on a general-purpose or special-purpose processor or controller. The commands and events shown in FIG. 6 may be implemented using any combination of function/method calls operating within a single process/thread, inter-process or inter-thread communications, commonly accessible shared memory locations, bus signals, bus interrupts, processor interrupts, etc. The particular structures and communications paths are provided for purposes of example, and many variations are possible in view of this disclosure.

Figure 7:
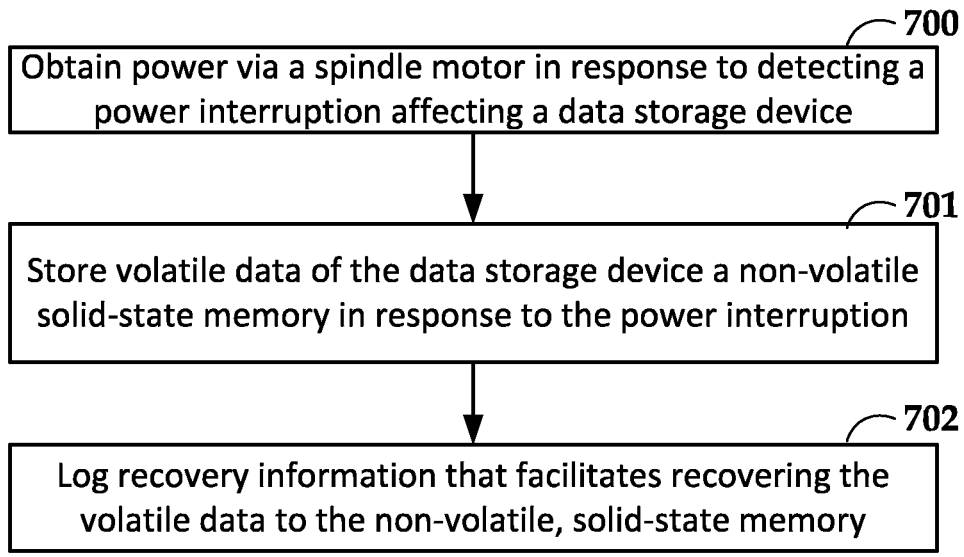
FIGS. 7 and 8 are flowcharts illustrating methods according to example embodiments.

In reference now to FIG. 7, a flowchart illustrates a method according to an example embodiment. At block 700, power is obtained via a spindle motor in response to detecting a power interruption affecting a data storage device. At block 701, volatile data of the data storage device is stored to a non-volatile solid-state memory in response to the power interruption. At block 702, recovery information is logged to the non-volatile, solid-state memory, the recovery information facilitating recovery of the volatile data.

Figure 8:
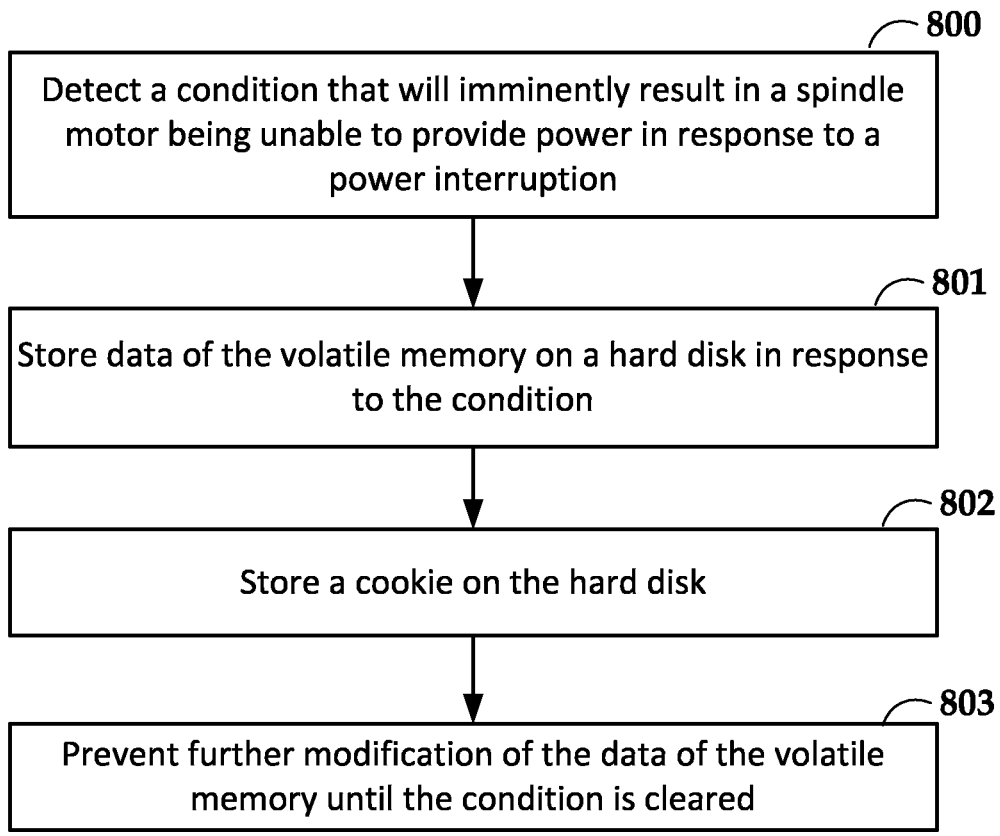

In reference now to FIG. 8, a flowchart illustrates a method according to another example embodiment. At block 800, a condition is detected that will imminently result in a spindle motor being unable to provide power in response to a power interruption. At block 801, data of the volatile memory is stored on the hard disk in response to the condition. The method may also involve storing a cookie on the hard drive as shown at block 802, and preventing further modification of the data of the volatile memory until the condition is cleared, as shown at block 803.

The forgoing description provides example embodiments for protecting volatile data of a storage device in response to a state reset and notes that different data formats may be protected. One data format, which is described below, includes data packets from multiple write commands that may be bundled together in a volatile memory such as 116 of FIG. 1. The bundled data may be transferred from the volatile memory to a temporary location (or media cache) on, for example, main persistent storage media 104 of FIG. 1 before the data packets in the bundle(s) are stored into their final destination locations on main persistent storage media 104 of FIG. 1. An occurrence of an unexpected state reset of the data storage device while a bundling process is taking place in the volatile memory can result in a loss of an entire bundle of data packets and/or journaling information associated with bundle formation. This could lead to data files that are corrupt, incomplete, or otherwise unusable, and such mis-compares may be unknown to a host such as 114 of FIG. 1. Additional procedures, which are described in detail further below, are employed to protect volatile data that may include multiple data packets that are bundled together. Prior to providing details regarding the additional protection procedures, a data storage disk with a temporary data storage location (or media cache) and final destination locations for the data is described below in connection with FIG. 9.

Figure 9:
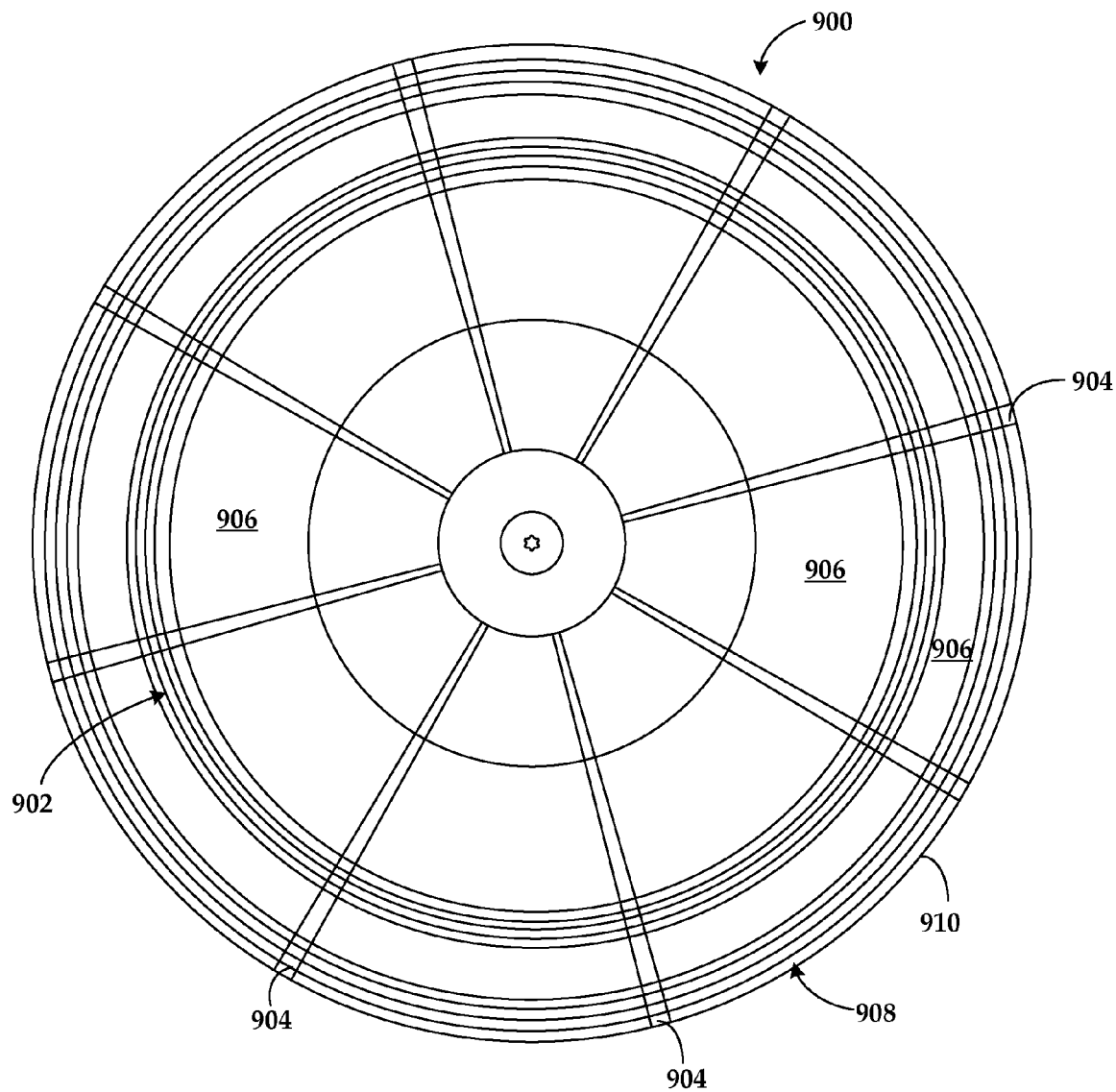
FIG. 9 is a diagrammatic illustration of a recording structure of an exemplary data disk in accordance with an embodiment.

FIG. 9 shows a recording structure of an exemplary data disk 900 in accordance with an embodiment. Disk 900 is a detailed embodiment of a disk 106 of FIG. 1. In this embodiment, a surface of disk 900 includes a number of concentric tracks 902. When configured with radial servo burst sectors 904, each disk track 902 is divided into slices called data wedges or sectors 906 between the burst sectors 904. Burst sectors 904 include data for maintaining accurate positioning of a data head (not separately shown) over a track 902 and are positioned at predetermined spaced locations around the disk 900.

As the disk 900 rotates, the data head reads the servo information containing an address within the servo bursts 904 and sends the servo information back to a servo control system (not shown). The servo control system checks whether the address in the servo information read from burst sectors 904 corresponds to the desired head location. If the address does not correspond to the desired head location, the servo control system adjusts the position of the head to the correct track location.

As indicated above, each track 902 includes discrete data sectors 906 containing stored user information. Besides containing user information, each data sector 906 may also include other data to help identify and process the user information.

In accordance with an embodiment, a portion of the disk 900 is reserved for use as a temporary location (or media cache) 908. Temporary location 908 is shown in FIG. 9 as being a circumferential grouping of tracks 902 located proximate to an outer diameter 910 of disk 900. Temporary location 908 shown in FIG. 9 is exemplary and it should be apparent to those skilled in the art that this portion 908 may include any number of tracks 902 and also may be on any region (circumferential or radial) of disk 900.

Apparatus 102 of FIG. 1 may use temporary location 908 in conjunction with volatile cache 120 of FIG. 1 to manage data as the data is being transferred to and from its intended destination track 902 on disk 900. In some embodiments, disk 900 is a magnetic disk. In such embodiments, because temporary location 908 is on magnetic media (i.e., disk 900), temporary location 908 generally has a slower access time than volatile cache 120 of FIG. 1. However, temporary location 908 has the advantage of larger storage and a less expensive cost per unit of storage than volatile cache 120. As such, in an embodiment, apparatus 102 of FIG. 1 may manage the caching of data using each of the temporary location 908 and the volatile cache 120 based on the access time of each and the available capacity of each. It should be noted that temporary location 908 also has an advantage of being non-volatile.

In accordance with some embodiments, data sent from a sending interface such as host 114 of FIG. 1 to an apparatus such as 102 of FIG. 1 may be in a form of packets that include individual data blocks that are each sized smaller than a data region of each persistent storage location 906. For instance, the blocks may be 512 bytes in length, whereas the data region of each persistent storage location 906 may be 1024 bytes in length, 1536 bytes in length, 2048 bytes in length, etc. Blocks received from a sending interface that are of a different size (smaller or larger) than an allocated storage capacity of data storage regions (for example, individual data sectors) of persistent storage locations 906 and do not fit completely within a number of persistent storage locations 906 are referred to herein as unaligned blocks and data packets including such blocks are referred to herein as unaligned data packets. When host data block or packet sizes match the intended destination location sizes, the host blocks or packets are referred to herein as "aligned" blocks or packets. In embodiments in which unaligned blocks/packets are received in the storage device, certain processing needs to be carried out to properly accommodate the unaligned blocks into the persistent storage locations 906. The processing can include first reading whatever data is currently stored on physical destination locations (specific ones of persistent storage locations 906), for the unaligned blocks, into volatile cache 120 of FIG. 1 or non-volatile cache 122 of FIG. 1, for example, modifying the current data with the data in the unaligned blocks, and then writing the modified data to the respective specific ones of the persistent storage locations 906. This process, which is relatively time consuming, is referred to as a "read-modify-write" process. To alleviate potential performance losses that may occur by carrying out read-modify-write processes on individual commands in real-time, it may be efficient to bundle data packets from multiple commands, store the bundled packets in a temporary location on the disc, for example, and then transfer the packets within the bundle(s) to their final destination locations using read-modify-write processes, which are run in the background. The formation of data bundles in volatile memory and the storage of the bundles in the temporary location are described below in connection with FIGS. 10A through 10D.

Figures 10A, 10B:
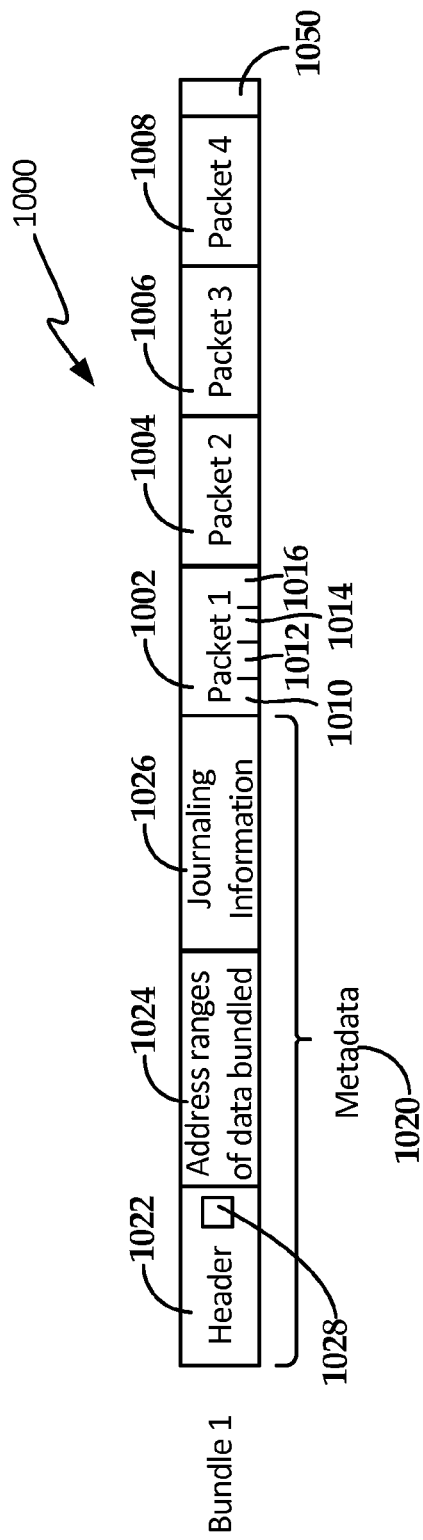
FIGS. 10A-10D are simplified block diagrams illustrating data bundle construction, storage and mapping.

FIG. 10A is a simplified block diagram that illustrates a bundle 1000 that includes data packets and metadata associated with the data packets. As shown in FIG. 10A, bundle 1000 includes four packets 1002, 1004, 1006 and 1008. Each different packet 1002, 1004, 1006, 1008 includes data from a different write command sent by a host such as 114 of FIG. 1 to a storage device such as apparatus 102 of FIG. 1. Each packet 1002, 1004, 1006, 1008 includes one or more data blocks. For example, packet 1002 may include four data blocks 1010, 1012, 1014 and 1016. It should be noted that packet sizes may vary and therefore at least one of packets 1004, 1006, or 1008 may have a different number of data blocks than packet 1002. Each data block 1010, 1012, 1014 and 1016 may be associated with a different LBA. For example, LBAs 0, 1, 2 and 3 may be associated with blocks 1010, 1012, 1014 and 1016. Also, blocks 1010, 1012, 1014 and 1016 may be unaligned blocks and therefore more than one of blocks 1010, 1012, 1014 and 1016 may be associated with a same physical sector on a disk such as 900. It should be noted that, in different embodiments, different numbers (2, 4, 6, 8, etc.) of host data blocks may be stored in a same physical sector. FIG. 10B shows a portion of an example mapping table 1018 in which two LBAs 0 and 1 are mapped to physical sector 0 and two LBAs 2 and 3 are mapped to physical sector 1.

In some embodiments, packets may be simply concatenated/bundled together in an order in which they are received in a data storage device such as 102 of FIG. 1. In other embodiments, at least some level of sorting of packets based on LBA proximity or proximity of final destination locations for the packets on the persistent storage locations 906 may be carried out as part of the bundling process such that each bundle includes only packets with proximate final destination locations on the data storage device. In some embodiments, at any point in time, at most only one data bundle may be stored in a volatile cache such as 120 of FIG. 1. Accordingly, in such embodiments, if a power loss occurs, there is at most one data bundle in the volatile cache that needs protection.

Referring back to FIG. 10A, as noted above, each bundle such as 1000 includes metadata associated with the data packets included in the bundle. In FIG. 10A, bundle 1000 includes metadata 1020, which is associated with packets 1002, 1004, 1006 and 1008. Metadata 1020 may include header information 1022, address ranges of data bundled 1024, and journaling information 1026. Header information 1022 may include a description of physical characteristics of bundle 1000 including address information regarding where bundle 1000 is to be written in a temporary storage location, such as 908 of FIG. 9, and versioning information. Header 1022 may also include a bundle index that is used to map a bundle to an address on the temporary storage location 908. For example, if 8000 is the starting address of the temporary storage location 908, and each bundle is of fixed size "50," for example, a bundle with index "n" would be written to: 8000+50*n. Address ranges of data bundled 1024 may include address information of final destination locations (such as 906 of FIG. 9) for the data packets 1002, 1004, 1006 and 1008. Journaling information 1026 may include invalidated ranges in between bundle writes and, in general, may include information about any new changes to data destined for one or more final destination locations (such as 906 of FIG. 9) made after a last update of that data on, for example, disk 900.

As indicated above, in order to apply power loss protection to a bundle such as 1000, data loss protection identifiers (for example, a set of special flags) that track a progress of bundle construction are utilized. Such data loss protection identifiers, which are denoted by references numeral 1028 and that are indicative of different states of bundle construction, may be stored as part of header information 1022. Details regarding the different data loss protection identifiers are provided further below.

Figure 10C:
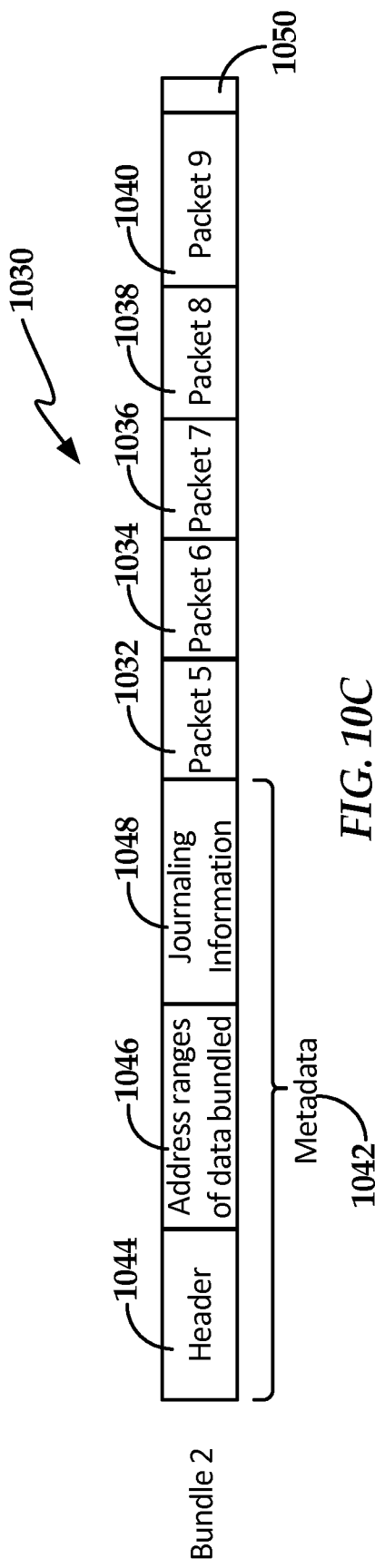

As noted above, after a bundle such as 1000 is constructed in non-volatile memory such as 116 of FIG. 1, the bundle may be stored at a temporary location, such as 908 of FIG. 9, which is capable of storing multiple bundles. FIG. 10C shows another bundle 1030, which is similar to bundle 1000, but includes a different number of data packets than bundle 1000. Specifically, as shown in FIG. 10C, bundle 1030 includes five packets 1032, 1034, 1036, 1038 and 1040, and associated metadata 1042 having header information 1044, address ranges of data bundled 1046 and journaling information 1048. In some embodiments, different bundles are all of a same size (i.e., have a same number of bits). Thus, in such embodiments, although bundle 1000 has four packets and bundle 1030 has five packets, bundle 1000 and bundle 1030 have a same predetermined size. If the packets and the associated metadata are less than the predetermined size at the end of bundle construction, padding bits 1050 (shown in FIGS. 10A and 10C) are appended/introduced into the bundle to attain the predetermined size. It should be noted that padding bits 1050 may be introduced at any suitable location in the bundle 1000, 1030. Having bundles of a predetermined size is not mandatory. However, as indicated in the bundle index example provided above, utilizing bundles of a predetermined size enables the use of a simple index to map the bundle to a location on temporary storage 908 where the bundle is written. This helps reduce metadata size and other processing complexities.

Figure 10D:
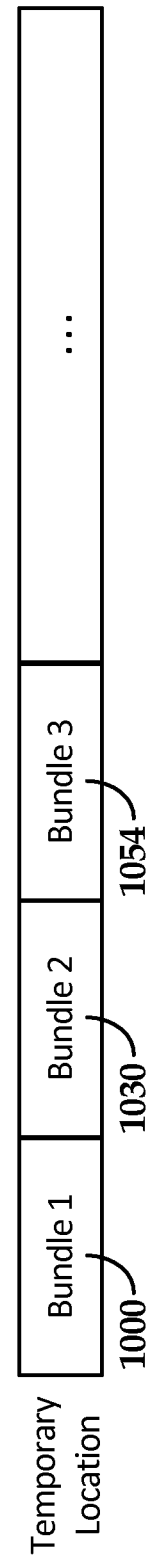

FIG. 10D shows a specific embodiment of temporary location 908 of FIG. 9. In the specific embodiment of FIG. 10D, the temporary location is denoted by reference numeral 1052. As can be seen in FIG. 10D, temporary location 1052 is configured to store bundles 1000, 1030, 1054, etc. As indicated earlier, packets within bundles such as 1000, 1030 and 1054 are transferred from temporary location 1052 to persistent storage locations such as 906 of FIG. 9 by utilizing a "read-modify-write" process. Details of a read-modify-write process are not provided in the interest of simplification.

As noted above, a bundle is constructed in a non-volatile memory such as 116 of FIG. 1 and then transferred a temporary location 1052 in non-volatile memory such as disk 900 of FIG. 9. Also, as indicated above, to facilitate protection of bundle data upon occurrence of an unexpected power loss to the data storage device during bundle construction, data loss protection identifiers that are indicative of different states of bundle construction are employed. In some embodiments, the following four different flags may be utilized as data loss protection identifiers:

1. State A, which indicates that bundle construction has started.
2. State B, which indicates that a temporary location pointer has been incremented. The temporary location pointer provides an address in the temporary storage location at which a next bundle is to be written.
3. State C, which indicates that all data packets have been added to the bundle.
4. State D, which indicates that the bundle is ready to be written into a location in non-volatile memory such as the temporary storage location (or media cache). The bundle is ready to be written into the temporary storage location when the packets, metadata and any padding information are all within a data structure allocated for bundle construction in the volatile memory.

The different flags A, B, C and D may comprise different bit combinations. In the event of a power loss, if construction of a current bundle in volatile memory is in one of states A, B or C (i.e., the bundle construction has not reached state D), the concatenation of packets to the bundle can be halted to save processing time and the remaining data packets can be stored outside of the bundle, or the remaining packets can be concatenated to the bundle. Whether packet generation is continued or not, metadata is generated to describe the full bundle and the current bundle in the volatile memory is complete (i.e., state D is reached). Non-volatile backup memory 132 of FIG. 1 is configured to receive the constructed bundle. Even when no bundle construction is being carried out at the time of the power loss (or the state reset), there may be journal entries in the volatile memory that need to be protected. Thus, special room may be made in non-volatile backup memory 132 of FIG. 1 to save such journal entries. Hence, the total space reserved in power safe non-volatile memory (i.e., backup memory 132) to protect the bundle writes may include room for a single bundle plus extra journal information. An additional journal flag may be utilized to indicate that valid extra journal information is recorded. Details regarding particular procedures for bundle data protection and for protection of any extra journal information are described below in connection with FIGS. 11 and 12.

Figure 11:
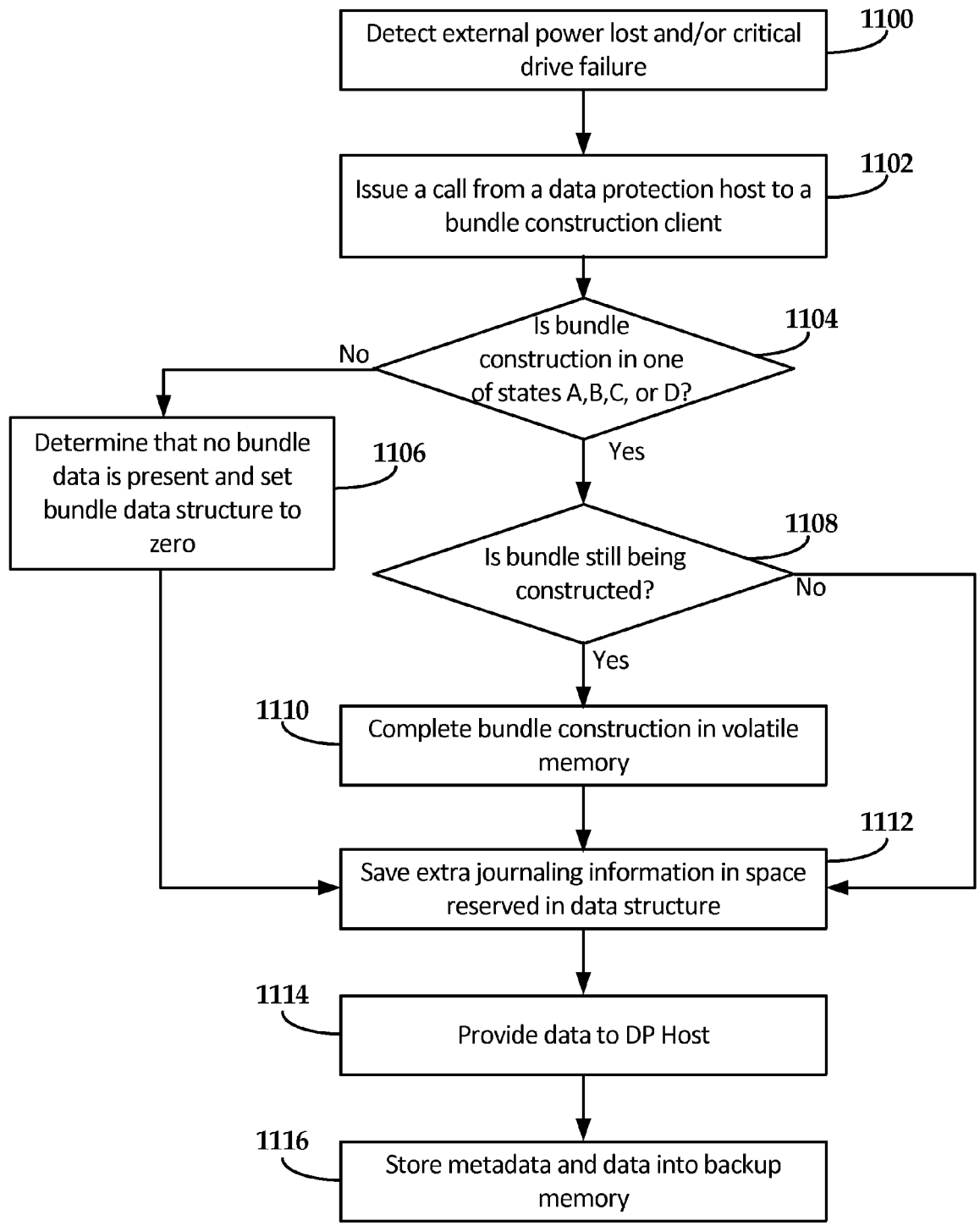
FIGS. 11, 12 and 13 are flowcharts illustrating methods according to example embodiments.

In reference to FIG. 11, a flowchart illustrates a procedure for protection of volatile bundle data and journal information according to an example embodiment. At step 1100, the procedure begins in response to detecting external power being lost and/or critical drive failure. At step 1102, a call is issued from a data protection host such as 127 of FIG. 1 to a bundle construction client indicating that bundle data needs to be saved. At step 1104, a determination is made as to whether bundle construction in volatile memory such as 116 of FIG. 1 is in any of states A, B, C or D. This may be carried out by examining bundle header information such as 1022 of FIG. 10A to determine whether one or more of flags A, B, C and D are present in portion 1028 of header information 1022. If none of flags A, B, C or D are detected at step 1104, at step 1106, a determination is made that no bundle data is present in the volatile memory and a portion of a data structure allocated for bundle data is cleared (for example, set to zero). If one or more of flags A, B, C and D are detected at step 1104, control passes to step 1108. At step 1108, a determination is made as to whether the bundle is still being constructed. Specifically, if flag D is not detected at step 1104, at step 1108, a determination is made that the bundle is still being constructed and control is passed to step 1110. At step 1110, construction of the bundle in volatile memory is continued until the bundle is completely formed. As indicated earlier, a reserve power module such as 130 of FIG. 1 maintains stable power to components used for bundle construction after external power has been removed. If flag D is detected at step 1104, a determination is made at step 1108 that bundle construction is complete. This results in step 1110 being bypassed and control being passed to step 1112. Also, completion of step 1106 or step 1110 results in control being passed to step 1112. At step 1112, any extra journaling information is saved in, for example, a data structure portion in volatile memory that is reserved for the additional journaling information. At step 1114, the client provides/returns the bundle data and/or extra journaling information to the data protection host such as 127 of FIG. 1. At step 1116, the data protection host stores the bundle data and/or extra journaling information into the backup memory such as 132 of FIG. 1.

When the power is restored, metadata and data are obtained from the backup memory, and one or more flags, which are a part of header information of the metadata, are interpreted to determine if valid bundle data and/or extra journaling information are available. If bundle data is present, the data is written into a location in the media cache, which is specified by the metadata. Any extra journaling information that may be obtained from the backup memory is saved in the volatile cache and suitably applied to corresponding metadata. A particular procedure for bundle data recovery when power is restored is described in connection with FIG. 12.

Figure 12:
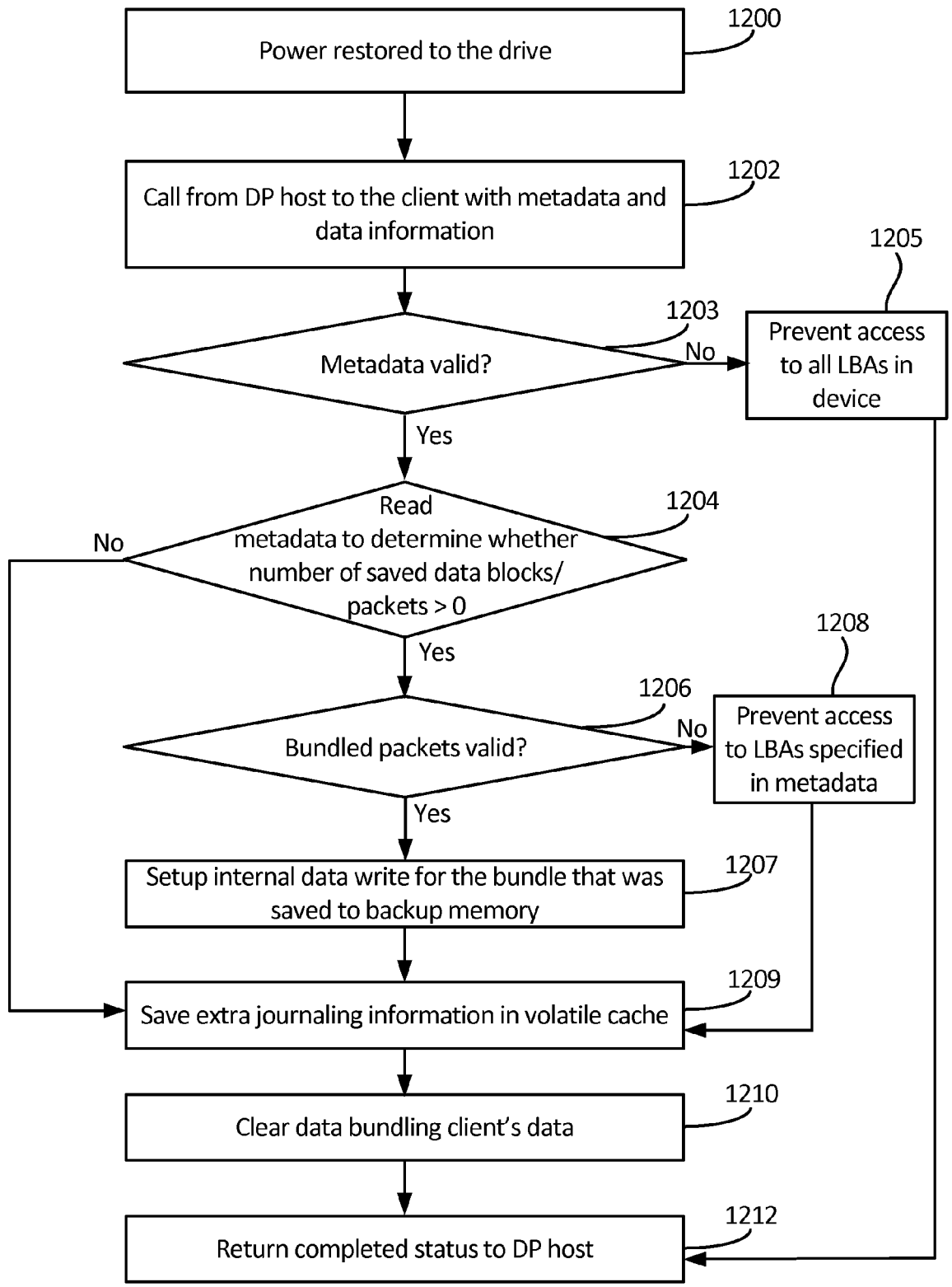

In reference to FIG. 12, a flowchart illustrates a procedure for recovering bundle data and/or journaling information after power on or reset according to an example embodiment. The procedure begins when restoration of power is detected at step 1200 as part of drive initialization, for example. At step 1202, any metadata, data and journaling information that may be stored in the backup memory are obtained by the data protection host and provided to the bundle construction client. At step 1203, the client determines whether the metadata is valid. If the metadata is invalid, at step 1205, the client prevents access to all LBAs (or all storage locations) in the data storage device because it does not know if or where miscompares might be and control is passed to step 1212. If the metadata is valid, at step 1204, the client reads the metadata to determine whether one or more data blocks are present in the provided metadata, data and journaling information. If one or more data packets are present, at step 1206, a determination is made as to whether the packets are valid. If any data packets are invalid, at step 1208, access to all LBAs contained in the invalid packets (as specified in the metadata) is prevented. If the data packets are valid, at step 1207, an internal write operation is executed in the data storage device to store the bundle into its location in the media cache, which is specified by the provided metadata. If it is determined at step 1204 that no data packets are present, then control is passed to step 1209. Also, after performance of step 1206, control is passed to step 1209. At step 1209, any extra journaling information is saved in the volatile cache. The extra journaling information may be used to recover device state information. Processing associated with the extra journaling information may involve removing headers, performing additional checks, and writing to disk. Once all the metadata, data and journaling information obtained from the backup memory after power on is suitably processed and written to a non-volatile location, at step 1210, the bundle construction client's data obtained from the backup memory is erased from locations other than the media cache and/or the final destination locations on the disk. At step 1212, the bundle construction client returns a completed status to the data protection host.

In case of device resets and power saving events that include spinning down of the drive, which may cause flushing of the volatile cache, the only information that needs to be protected is extra journaling information that may be in the volatile cache. Thus, during such resets and power saving events, a special write request is issued from the bundle construction client to the data protection host to save the extra journaling information to any non-volatile medium (for example, a disk or flash) and to remember the state of the save such that proper restoration can be applied when drive power conditions are restored. This mechanism ensures data integrity for performance features that rely on data moves in the drive across power cycles, resets and even power saving events. Details regarding power saving events and associated data protection are provided above in connection with FIG. 3.

Figure 13:
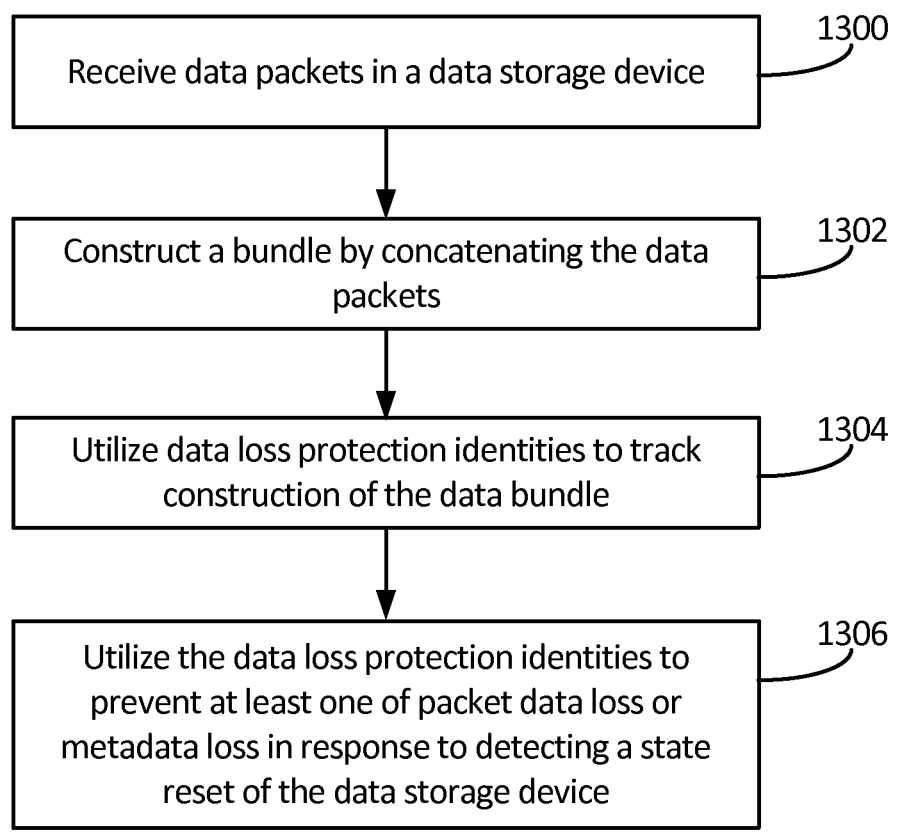

FIG. 13 is a flowchart according to one embodiment. At step 1300, a plurality of unaligned or aligned data packets are received in a data storage device. At step 1302, a data bundle is constructed in the data storage device by concatenating different ones of the plurality of unaligned data packets. At step 1304, data loss protection identifiers are utilized to track the construction of the data bundle. At step 1306, the data loss protection identifiers are employed to prevent at least one of packet data loss or metadata loss in response to detecting a state reset of the data storage device.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination and are not meant to be limiting, but purely illustrative. It is intended that the scope be limited not with this detailed description, but rather determined by the claims appended hereto.

What is claimed is:

1. A method comprising:
receiving, in a data storage device, a plurality of unaligned data packets;
constructing, in the data storage device, a data bundle by concatenating different ones of the plurality of unaligned data packets;
utilizing data loss protection identifiers to track the construction of the data bundle; and
employing the data loss protection identifiers to prevent at least one of packet data loss or metadata loss in response to detecting a state reset of the data storage device.

2. The method of claim 1 and wherein the plurality of data packets comprises at least one of aligned data packets or unaligned data packets.

3. The method of claim 1 and wherein the construction of the data bundle is carried out in a volatile memory.

4. The method of claim 3 and further comprising, in response to detecting the state reset in the data storage device, determining whether at least one of the data loss protection identifiers is present in the volatile memory.

5. The method of claim 4 and further comprising, if the data loss protection identifiers in the volatile memory upon detecting the state reset indicate that there is no bundle to protect, saving any extra journaling information in the volatile memory into a backup memory.

6. The method of claim 4 and further comprising, if the at least one of the data loss protection identifiers is present in the volatile memory upon detecting the state reset, determining, from the at least one of the data loss protection identifiers, whether the construction of the data bundle is in a completed state.

7. The method of claim 6 and further comprising, if the data bundle is not in a completed state in the volatile memory, completing the construction of the data bundle in the volatile memory.

8. The method of claim 7 and further comprising saving the completely constructed bundle into a backup memory.

9. The method of claim 8 and further comprising saving any extra journaling information from the volatile memory into the backup memory along with the completely constructed bundle.

10. The method of claim 3 and further comprising, storing contents of the volatile memory including the metadata into a backup memory.

11. The method of claim 10 and further comprising, in response to detecting restoration of power in the data storage device, examining the metadata from the backup memory to determine whether one or more of the data packets are a part of the contents of the volatile memory stored in the backup memory.

12. The method of claim 11 and further comprising, if one or more of the data packets are obtained, storing the one or more data packets into a media cache.

13. A data storage device comprising:
a controller coupled to a volatile memory of the data storage device and a backup memory of the data storage device, the backup memory comprising non-volatile memory, the controller configured to:
construct a data bundle in the volatile memory by concatenating different ones of a plurality of data packets received in the data storage device;
utilize data loss protection identifiers to track the construction of the data bundle; and
employ the data loss protection identifiers to prevent at least one of packet data loss or metadata loss in response to detecting a state reset of the data storage device.

14. The data storage device of claim 13 and wherein the data loss protection identifiers comprise at least four different data loss protection identifiers.

15. The data storage device of claim 14 and wherein the at least four data loss protection identifiers include:
a first identifier that indicates that construction of the data bundle has started;
a second identifier that indicates that a temporary location pointer has been incremented to indicate a location at which the data bundle is to be stored in a media cache;
a third identifier that indicates that all data packets have been incorporated into the data bundle; and
a fourth identifier that indicates that the bundle construction is complete and ready to be written into the media cache.

16. The data storage device of claim 13 and wherein the controller is further configured to detect the state reset of the data storage device and configured to complete the construction of the data bundle in the volatile memory upon detecting the state reset.

17. The data storage device of claim 16 and wherein the controller is configured to transfer the completed data bundle from the volatile memory to the backup memory.

18. The data storage device of claim 17 and wherein the controller is further configured to detect restoration of power in the data storage device and, upon detecting restoration of power in the data storage device, configured to obtain stored contents including the metadata from the backup memory.

19. The data storage device of claim 18 and wherein the controlled is further configured to determine whether the metadata obtained from the backup memory is valid.

20. The data storage device of claim 19 and wherein the controller is further configured to, if the metadata is valid, determine, from the metadata, whether a number of data packets in the obtained stored contents is greater than zero.

21. The data storage device of claim 20 and wherein the controller is further configured to, if the number of data packets is greater than zero, determine whether the data packets are valid.

22. The data storage device of claim 21 and wherein the controller is further configured to, if the data packets are valid, store the data bundle into a media cache.

23. The data storage device of claim 21 and wherein the controller is further configured to, if the data packets are invalid, prevent access to logical block addresses contained in the invalid data packets as specified in the metadata.

24. The data storage device of claim 19 and wherein the controller is further configured to, if the metadata is invalid, prevent access to all logical block addresses in the data storage device.

25. The data storage device of claim 19 and wherein the controller is further configured to, if the metadata is valid, store any extra journaling information including the obtained stored contents for the backup memory into a non-volatile memory in the data storage device other than the backup memory and clear the backup memory after the contents have been successfully saved.

* * * * *